US012746673B2

(12) United States Patent
Wagner et al.

(10) Patent No.: US 12,746,673 B2
(45) Date of Patent: Sep. 29, 2026

(54) VISUAL SERVOING OF A ROBOT

(71) Applicant: ROBOVISION, Ghent (BE)

(72) Inventors: Andrew Wagner, Ghent (BE); Tim Waegeman, Ghent (BE); Rob Gielen, Ghent (BE); Lidewei Vergeynst, Ghent (BE); Matthias Verstraete, Ghent (BE); Bert Mortier, Ghent (BE)

(73) Assignee: ROBOVISION, Ghent (BE)

( * ) Notice: Subject to any disclaimer, the term of this patent is extended or adjusted under 35 U.S.C. 154(b) by 84 days.

(21) Appl. No.: 18/550,950

(22) PCT Filed: Mar. 15, 2022

(86) PCT No.: PCT/EP2022/056735

§ 371 (c)(1),
(2) Date: Sep. 15, 2023

(87) PCT Pub. No.: WO2022/194883

PCT Pub. Date: Sep. 22, 2022

(65) Prior Publication Data

US 2024/0165807 A1 May 23, 2024

(30) Foreign Application Priority Data

Mar. 17, 2021 (EP) ..................................... 21163101
Mar. 17, 2021 (EP) ..................................... 21163105
Mar. 17, 2021 (EP) ..................................... 21163107

(51) Int. Cl.
*B25J 9/16* (2006.01)
*G06T 7/70* (2017.01)
(Continued)

(52) U.S. Cl.
CPC ........... *B25J 9/1669* (2013.01); *B25J 9/1697* (2013.01); *G06T 7/70* (2017.01); *G06V 10/255* (2022.01);
(Continued)

(58) Field of Classification Search
CPC ......... B25J 9/1669; B25J 9/1697; G06T 7/11; G06T 7/70; G06T 2207/10024;
(Continued)

(56) References Cited

U.S. PATENT DOCUMENTS 7,765,780 B2 8/2010 Koselka et al.
9,532,508 B1 * 1/2017 Stubbs .................. A01D 91/04
(Continued)

FOREIGN PATENT DOCUMENTS

CN 109948444 A 6/2019
JP 6749720 B1 9/2020
WO WO 2020/155277 A1 8/2020

OTHER PUBLICATIONS

Wiersma, Ruben, Elmar Eisemann, and Klaus Hildebrandt. "CNNs on surfaces using rotation-equivariant features." ACM Transactions on Graphics (ToG) 39.4 (2020): 92-1. accessed Apr. 29, 2025.*
(Continued)

*Primary Examiner* — Blake A Wood
(74) *Attorney, Agent, or Firm* — Knobbe, Martens, Olson & Bear, LLP

(57) ABSTRACT

A method for computing a pose for a robot head for handling an object by means of a handle connected to the object, including: (a) obtaining, by means of a vision sensor, an image of a scene including the object and the handle, the image including 3D information and preferably color information; (b) segmenting, by means of a trained segmentation NN, the image, according to a plurality of semantic components including at least a first semantic component relating to the object and a second semantic component relating to the handle; (c) determining, based on the plurality of semantic components, handling data for handling the object, the handling data including a handling position being on the handle; and (d) computing, based on the handling data, a
(Continued)

pose for the robot head, the pose including at least a robot head position for approaching the handle.

20 Claims, 3 Drawing Sheets

(51) Int. Cl.
*G06V 10/20* (2022.01)
*G06V 10/26* (2022.01)
*G06V 20/70* (2022.01)

(52) U.S. Cl.
CPC .............. *G06V 10/26* (2022.01); *G06V 20/70* (2022.01); *G06T 2207/20084* (2013.01)

(58) Field of Classification Search
CPC .. G06T 227/10028; G06T 2207/20084; G06V 10/255; G06V 10/26; G06V 10/82; G06V 20/20; G06V 20/188; G06V 20/68; G06V 20/70
See application file for complete search history.

(56) References Cited

U.S. PATENT DOCUMENTS

| | | | | |
|---|---|---|---|---|
| 2013/0204437 | A1* | 8/2013 | Koselka | A01D 91/00 701/25 |
| 2018/0046874 | A1* | 2/2018 | Guo | G06V 10/507 |
| 2018/0092304 | A1* | 4/2018 | Moore | B25J 9/0084 |
| 2019/0261566 | A1* | 8/2019 | Robertson | G06T 7/50 |
| 2020/0008355 | A1 | 1/2020 | Nir et al. | |
| 2021/0000013 | A1* | 1/2021 | Robertson | B25J 15/0019 |
| 2021/0368687 | A1* | 12/2021 | Wisdom | A01D 45/26 |

OTHER PUBLICATIONS

Bateux, Q. et al. “Training deep neural networks for visual servoing.” 2018 IEEE international conference on robotics and automation (ICRA). IEEE, 2018.

International Search Report and Written Opinion received in PCT Application No. PCT/EP2022/056735, mailed on Nov. 28, 2022.

Kragic, D. et al. “Survey on visual servoing for manipulation.” Computational Vision and Active Perception Laboratory, Fiskartorpsv 15 (2002): 2002.

Lehnert, C. et al. “A sweet pepper harvesting robot for protected cropping environments.” arXiv preprint arXiv:1810.11920 (2018).

* cited by examiner

VISUAL SERVOING OF A ROBOT

FIELD OF THE INVENTION

The present invention relates to handling of objects by means of robots based on deep learning and involving visual servoing.

BACKGROUND ART

In image analysis of 3D objects in the context of robot automation, visualization and 3D image reconstruction are fundamental for enabling accurate handling of physical objects.

Visual servoing is a method for robot control where camera or vision sensor input is processed to provide feedback for a robot control signal in a closed-loop manner. Finding suitable methods to continuously process visual inputs for robot control is a problem known to the skilled person, see, e.g., (Kragic, D, Christensen, H I, Survey on visual servoing for manipulation, Computational Vision and Active Perception Laboratory, 2002.

In the domain of visual servoing, (Quentin Bateux, Eric Marchand, Jürgen Leitner, François Chaumette, Peter Corke, Training DeepNeural Networks for Visual Servoing, IEEE International Conference on Robotics and Automation (ICRA), 2018) discloses the use of deep learning, yet is not adapted to the handling of objects.

US 2020/0008355 A1, CN 109948444 A, and WO 2020/155277 A1 disclose the use of deep learning but are not adapted for visual servoing and/or do not disclose any detail regarding how deep learning is to be applied.

JP 6749720 B1 discloses neural networks but does not disclose the use of neural networks for visual servoing. US 2021/0000013 A1 discloses a related system and method.

A known challenge of using deep learning for visual servoing is that typically a lot of data is required for training the system. Also, for an effective closed-loop control algorithm, the neural network needs to be processed sufficiently fast, as the latency will determine the operating speed.

The present invention aims at addressing the issues listed above.

SUMMARY OF THE INVENTION

According to a first aspect, the present invention provides a method for computing a pose for a robot head for handling an object by means of a handle connected to said object, said handle optionally being comprised in said object, comprising the steps of:

(a) obtaining, by means of a vision sensor, an image of a scene comprising said object and said handle, said image comprising 3D information and preferably color information;

(b) segmenting, by means of a trained segmentation NN, preferably a trained semantic segmentation NN, said image, according to a plurality of semantic components comprising at least a first semantic component relating to said object and a second semantic component relating to said handle;

(c) determining, based on said plurality of semantic components, handling data for handling said object, said handling data comprising a handling position being on said handle; and (d) computing, based on said handling data, a pose for said robot head, said pose comprising at least a robot head position for approaching said handle.

In example embodiments, the vision sensor is not mounted on the robot head. In other example embodiments, the vision sensor is mounted on the robot head.

A main advantage of such a method is the accurate and fast visual servoing provided by such a method. Particularly, the invention enables a visual servoing control loop with low latency. A detailed view of the object at several sides, as is often assumed in prior art methods, entails suboptimal handling in terms of speed. In order to actuate the robot head towards an object using visual servoing, the handle for the object is of prime interest.

In embodiments, the method comprises the step (α) preceding said step (a): (α) performing, by means of a second vision sensor different from said vision sensor and not mounted on said robot head, a pre-scan of an environment for determining whether said handling is required. An advantage of such a pre-scan may be that needless actuation of the robot head and/or needless activity of the first vision sensor may be prevented. Hereby, the mounting on a portion of the system different from the robot head and preferably not moving along with the robot head may be advantageous since it enables, e.g., tracking of the movement of the system as a whole, without being influenced by the movement of the robot head. This may be particularly advantageous for pre-scanning, as it allows preparing the handling of a next object while the handling of the current object is still ongoing, without experiencing impact from the robot head movement that may be involved in the handling. Furthermore, the position and/or vision angle of the second vision sensor may be advantageously chosen such that the feasibility and/or requirement of handling may be optimally predicted. In embodiments, this may relate to choosing a position and/or vision angle for the second vision sensor that is different from the position and/or vision angle of the first vision sensor. Another advantage may relate to overall increase of speed of object handling. In embodiments, this may relate to the respective first and second vision sensor operating according to respective first and second vision cycles, wherein the first and second vision cycle are at least partially overlapping. This may allow to parallelize the actual object handling cycle of a current object, involving the first vision sensor, with the pre-scan relating to the handling of the next object, involving the second vision sensor. In this regard, the pre-scan may allow to prepare the handling of a next object while the handling of the current object is still ongoing, yielding a speed gain. In embodiments wherein the robot head belongs to a movable system moving between different system positions, the speed increase may relate, amongst others, to the avoiding of system positions for which handling is not required and/or not feasible. Conversely, the speed increase may relate, amongst others, to the determining of system positions for which it is predicted that object handling will be possible. Thereby, system positions may relate, e.g., to stopping positions, wherein the system may stop at said positions for performing the object handling. Additionally, or alternatively, system positions may relate, e.g., to positions belonging to an intended movement trajectory, wherein the system may or may not be able to perform the object handling without standing still, e.g., by moving sufficiently slowly. Yet another advantage of pre-scanning may lie in that it may allow tailoring the automation of object handling to the concrete real-life task at hand. These advantages may further be appreciated considering Example 6 and 7.

In embodiments, the vision sensor is mounted on said robot head. This has the advantage of allowing a more accurate view on the object as the robot head approaches the object, according to several steps of the control loop.

In embodiments, the object belongs to a plurality of two or more objects comprised in said scene, and preferably the handle is shared by the plurality of objects being clustered objects.

In embodiments, the segmentation NN is a semantic segmentation NN. In embodiments, the segmentation NN is an instance segmentation NN.

In a second aspect, the invention provides a device handling an object, comprising a processor and memory comprising instructions which preferably, when executed by said processor, cause the device to execute a method according to the invention.

In a further aspect, the invention provides a for handling an object, comprising:

a robot head;

a vision sensor;

actuation means for actuating said robot head;

a device, said device being connected to said vision sensor and said robot head, said device comprising a processor and memory comprising instructions which preferably, when executed by said processor, cause the device to execute a method according to the invention;

wherein said device is configured for:

obtaining, from said vision sensor, an image of a scene comprising said object and a handle connected to said object, said image comprising 3D information and preferably color information;

segmenting, by means of a trained segmentation NN, preferably a semantic segmentation NN, said image, according to a plurality of semantic components comprising at least a first semantic component relating to said object and a second semantic component relating to said handle;

determining, based on said plurality of semantic components, handling data for handling said object, said handling data comprising a handling position being on said handle;

computing, based on said handling data, a pose for said robot head, said pose comprising at least a robot head position for approaching said handle; and sending, to the actuation means, actuation instructions for actuating said robot head toward said robot head position;

wherein said vision sensor is configured for:

acquiring said image;

sending the image to said device;

wherein said actuation means is configured for:

receiving actuation instructions from said device;

actuating said robot head in accordance with said actuation instructions.

Preferred embodiments and their advantages are provided in the description and the dependent claims.

BRIEF DESCRIPTION OF THE DRAWINGS

The present invention will be discussed in more detail below, with reference to the attached drawings.

DESCRIPTION OF EMBODIMENTS

Figure 1:
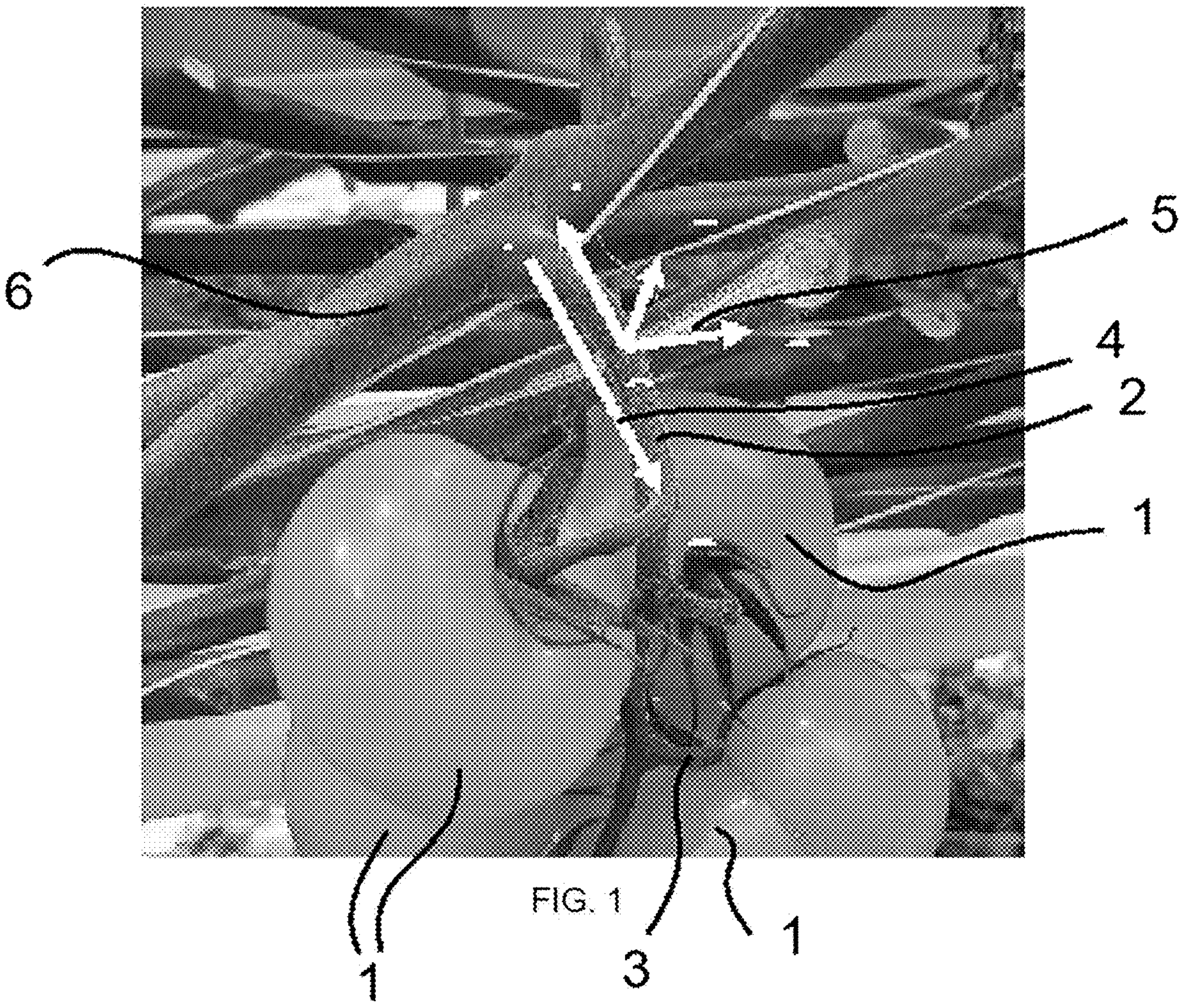
FIG. 1 shows an example bunch of tomatoes to be detected, approached, and preferably picked.

The present invention will be described with respect to particular embodiments and with reference to certain drawings but the invention is not limited thereto but only by the claims.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The terms "branch" and "stem" relate to embodiments wherein the object to be detected relates to a part of a plant, e.g., a fruit or a leaf. The terms "main stem" and "stem" are therein used in a relative manner, wherein the main stem branches out into one or more stems. Hence, the terms "main stem" and "stem" should not be construed as limiting, and merely relate to relative labels for respective parts of a plant.

The term "robot" refers to robot controllable for carrying out a movement. In embodiments the robot is a robot arm. Preferably the robot comprises a robot head at its distal end, wherein the vision sensor may or may not be mounted on the robot head and/or may or may not be mounted on a portion of the robot in the vicinity of the distal end. In embodiments the robot is suitable for performing pivoting and/or translation with respect to said head along at least one dimension, preferably at least two dimensions, more preferably three dimensions.

The term "image" relates to any representation of a generic scene, comprising visual data comprising any or any combination of pixels, voxels, vectors, and/or equivalent visual data. Any visual data in said image, e.g., a pixel or voxel, may be associated with one or more of color information, e.g. RGB information, and 3D information. In embodiments, the 3D information relates to depth data according to cartesian, cylindrical and/or spherical coordinates. In embodiments, the 3D information comprises, preferably consists of, depth information coded with one or more real value, e.g., one real value. In embodiments, the 3D information comprises, preferably consists of, information corresponding to two or more 2D sub-images relating to different viewing angles, e.g., a pair of a left sub-image and a right sub-image. In embodiments, the image is a voxel representation. In embodiments, the image is a pixel representation comprising, per pixel, RGBD data. In embodiments, the image comprises portions that are grayscale and/or portions that are colored, e.g., RGB-colored. In embodiments, the image is a greyscale image preferably comprising depth information. In embodiments, the image is a color image preferably comprising depth information.

In this document, the terms "object" and "handle" are generic terms referring to any generic object, wherein said handle is a second generic object that is directly or indirectly connected to said object and may serve as a handling means, e.g., a portion that can be clamped, with respect to said object. In this regard, the terms "object" and "handle" are merely relative functional descriptors that indicate a relation between the object and the handle. The terms cannot be construed as limiting the invention in any way.

In this document, reference is made to "re-rendering". This relates to data for which depth information is available, e.g., RGBD data, which is different from an actual 3D voxel representation. By re-rendering based on the depth information, a partial re-rendering to 3D may be performed. However, for some portions of the scene, e.g., surfaces on the behind, it may not be possible to perform rerendering.

In embodiments, the vision sensor, one of the first and second sensor, or any of the first, second and any further vision sensors, relates to any of the following types 1-6. In example embodiments, the first and the second vision sensor are of a different type. In example embodiments, the first and the second vision sensor are of the same type. In example embodiments, at least one of the first and second vision sensor, preferably both the first and second to any vision sensor, relate of the following types 1-6.

| | Type 1 | Type 2 | Type 3 | Type 4 | Type 5 | Type 6 |
|---|---|---|---|---|---|---|
| Technology | Stereo IR | Stereo IR | Structured light | Structured light | Lidar | Time of flight |
| Range | 0.11 m-10 m | 3 m | 0.3 m-2 m | 0.16 m-0.27 m | 0.25 m-9 m | 0.25 m-2.21 m |

A variety of such sensors is known to the skilled person. In embodiments, the vision sensor, i.e. the first and/or second vision sensor, is based on stereo IR or structured light or visible light or lidar or time of flight or laser line scanning. In embodiments the range is between 1 mm and 3 m, preferably between 2 mm and 2 m, more preferably between 10 mm and 1 m. In embodiments, the vision sensor comprises an ASIC for minimal latency output. This has the advantage of increased speed for the overall visual servoing method. In embodiments, the vision sensor outputs RGB data output as well as depth information, abbreviated as RGBD. Depth information is preferably obtained from 3D reconstructions built into the sensor, based, e.g., on stereo IR and/or multiple cameras and/or multiple camera positions within the same vision sensor. In embodiments, the vision sensor is compact, with maximum dimension less than 300 mm, preferably less than 200 mm, and/or with weight less than 1 kg, preferably less than 0.5 kg, more preferably less than 0.3 kg. Preferably the vision sensor is comprised in a single housing so as to easily mount on the robot head. Preferably the vision sensor has latency less than 300 ms, more preferably less than 200 ms, even more preferably less than 100 ms, most preferably less than 20 ms. Preferably the vision sensor is suitable durable and/or moisture tolerant and/or able to be conveniently sterilized. In embodiments, the vision sensor is able to provide a frame rate that is between 1 Hz and 100 Hz, e.g., 1, 2, 3, 4, 5, 6, 7, 8, 9, 10, 25, 30, 50 or 60 Hz.

In embodiments, the invention relates to a plurality of vision sensors comprising said vision sensor and a second vision sensor different from said vision sensor. Therein, each of the vision sensors may be comprised in the system according to the invention. The second vision sensor may be structurally different from said vision sensor, e.g. it may be of a different type of said types 1-6, but may also be structurally similar or equal, e.g., it may belong to the same type of said types 1-6. In embodiments with a plurality of vision sensors, said image of said scene comprising 3D information may be obtained from different respective images of the respective vision sensors. embodiments with a plurality of vision sensors, at least one, e.g., one, is not mounted on said robot head, and preferably at least one, e.g., one, is mounted on said robot head. The latter embodiments may be combined with embodiments wherein one or more vision sensors belonging to said plurality of vision sensors may be used primarily or solely for any or all of said steps (a) to (d), e.g. relating to approaching the object, whereas the remaining one or more vision sensors may be used primarily or solely in relation to the actual handling of the object, e.g., for clamping and/or cutting with respect to said object or handle. Additionally, or complementary thereto, of the plurality of vision sensors, a first vision sensor may be mounted on any portion of the system, including the robot head, and a second vision sensor may be not mounted on the robot head but elsewhere, e.g., on a portion of the system of the invention. In example embodiments, the second vision sensor is mounted on a portion of the system. In such example embodiments, the system may comprise system actuation means different from said actuation means being robot head actuation means. Thereby, the system actuation means may relate, e.g., to wheels and/or tracks, wherein the tracks may, e.g., comprise steel and/or rubber, for instance be wheels, steel tracks or rubber tracks, or wheels moving over tracks such as train tracks or streetcar tracks. In example embodiments, the system may be a cart or wagon, and the second vision sensor, or each of the first and second vision sensor, may be cart-mounted or wagon-mounted, e.g., it may be mounted on a pole or frame or beam or chassis or bumper or side panel or front panel or back panel or spoiler of the cart. In embodiments, preferably combined with such example embodiments, the first vision sensor may be used for any or all of the steps (a) to (d), relating at least to approaching the object, and the second vision sensor, for a step (α) preceding step (a). Thereby, step (α) may relate to performing a pre-scan of an environment for determining whether said handling is required. In example embodiments, the performing of the pre-scan relates to (i) obtaining, by means of the second vision sensor, an environment image; (ii) detecting, within said environment image and with respect to said object, an object presence and preferably an object position; and (iii) determining, based on said environment image and said detection with respect to said object, whether to carry out steps (a) to (d). In example embodiments, step (iii) may relate to determining, based on said environment image and said detection with respect to said object, whether to carry out steps (a) to (d) or to actuate a system comprising said robot head toward a new system position. The second vision sensor may be different from the first sensor yet may be similar in technology and specifications. In example embodiments, both the first and second sensor are RGBD cameras.

In embodiments with a single visual sensor, the visual sensor may be a stationary visual sensor, or, equivalently, a static visual sensor, not moving along with the movement of the robot head. This may relate to visual servoing according to a static camera case, comparable to a human with human vision reaching to grab something without moving the head. In embodiments with a single visual sensor, the visual sensor may be a moving visual sensor actuated at least in part based on the movement of the robot head, e.g., by being mounted directly or indirectly on the robot head. Being mounted on the robot head may relate to "end of arm tooling" as known to the skilled person. This may relate to visual servoing according to a moving camera case, comparable to a dog catching a ball. In embodiments, a plurality of vision sensors is provided, e.g., two in number, wherein at least one, e.g., one, is a stationary vision sensor, and the other at least one, e.g., one, is a moving vision sensor. In embodiments, a plurality of vision sensors is provided, e.g., two in number, wherein a first vision sensor may or may not be robot-head-mounted, and the other at least one, e.g., a second vision sensor, is a system-mounted vision sensor, i.e., a vision sensor mounted on a portion of the system different from the robot head. Thereby, preferably, the first vision sensor relates to visual servoing of the robot head and the second vision sensor relates to performing an environment for determining whether said handling is required.

In embodiments, the performing of the pre-scan comprises segmenting, by means of a trained pre-scan segmentation NN, preferably a trained pre-scan semantic segmentation NN, a pre-scan image acquired with the second vision sensor, according to one or more semantic components, preferably including a semantic component that corresponds to the object to be handled. In alternative embodiments, the performing of the pre-scan does not involve any NN, but may be based, e.g., on image processing of the pre-scan image by means of a detection algorithm suitable for the detection of the object and/or of a feature of the object. Such an algorithm may, e.g., use color information present in pre-scan image pixels or voxels for determining a feature of the object. In examples relating to plants, the plant or fruit color may be a feature of the object that is fed to such an algorithm.

In embodiments, the respective first and second vision sensor operate according to respective first and second vision cycles, wherein the first and second vision cycle are at least partially overlapping. In embodiments, step (α), relating to a next object, takes place at least partially during a cycle (a)-(d), relating to a current object. This may allow to parallelize the actual object handling cycle of a current object, involving the first vision sensor, with the pre-scan relating to the handling of the next object, involving the second vision sensor. In this regard, the pre-scan may allow to prepare the handling of a next object while the handling of the current object is still ongoing, yielding a speed gain.

In embodiments, said second vision sensor is mounted according to a second vision angle different from a first vision angle of said first vision sensor, wherein preferably said second vision sensor is mounted tilted toward a motion direction by at least 5°, preferably between 10° and 30°, and/or wherein preferably said first vision sensor is mounted perpendicularly with respect to said motion direction. This may allow to parallelize the actual object handling cycle of a current object, involving the first vision sensor pointed toward a current object, with the pre-scan relating to the handling of the next object, involving the second vision sensor pointed in the direction of next objects. By applying different angles, the pre-scan may allow to better prepare the handling of a next object while the handling of the current object is still ongoing.

In embodiments, the object comprises a rounded 3D surface corresponding to a distinctive feature on a depth image, such as a curvature. For instance, the curvature of a fruit or vegetable may be easily recognizable based on 3D features, and may be detected accordingly. In such embodiments, depth data helps identifying the object and segmenting the data. In embodiments, the object comprises a color that is distinctive, and the image comprises color information. For instance, colors in the red band of the spectrum are indicative of a tomato.

In some embodiments with a 2D approach, data is analyzed in a RGBD (Red Green and Blue plus Depth) representation, which is what many sensors with 3D information return. In some embodiments with a 3D approach, the RGBD image is converted to an unordered cloud of colored points (point cloud). In this representation, all three spatial dimensions may be handled uniformly, but the adjacency of pixels may be thrown out.

In embodiments, the 2D NN includes any or any combination of: U-net, U-net++, see (Zongwei Zhou, Md Mahfuzur Rahman Siddiquee, Nima Tajbakhsh, Jianming Liang, UNet++: A Nested U-Net Architecture for Medical Image Segmentation, 4th Deep Learning in Medical Image Analysis (DLMIA) Workshop, 2018.). In embodiments, the 3D NN includes any or any combination of Dynamic Graph Convolutional Networks (see Yue Wang, Yongbin Sun, Ziwei Liu, Sanjay E. Sarma, Michael M. Bronstein, Justin M. Solomon, Dynamic Graph CNN for Learning on Point Clouds, Computer Vision and Pattern Recognition, 2019), KPConv (Hugues Thomas, Charles R. Qi, Jean-Emmanuel Deschaud, Beatriz Marcotegui, Francois Goulette, Leonidas J. Guibas; The IEEE International Conference on Computer Vision (ICCV), 2019, pp. 6411-6420).

In preferred embodiments, the NN comprises a semantic segmentation NN being a 2D u-net. U-net is found to be particularly suitable due to increased speed and/or increased reliability, enabled by data augmentation and elastic deformation, as described in more detail in, e.g., (Ronneberger, Olaf; Fischer, Philipp; Brox, Thomas (2015). "U-Net: Convolutional Networks for Biomedical Image Segmentation. arXiv:1505.04597").

In preferred embodiments, said at least one trained 3D NN comprises a semantic segmentation NN being a 3D PointNet++. PointNet++ is an advantageous choice in that it provides both robustness and increased efficiency, which is enabled by considering neighbourhoods at multiple scales. More detail is provided, e.g., in (Charles R. Qi et al., PointNet++: Deep Hierarchical Feature Learning on Point Sets in a Metric Space, 2017, https://arxiv.org/abs/1706.02413). In more preferred embodiments, said at least one trained 3D NN comprises a semantic segmentation NN being a RandLA-Net.

Neural networks, NNs, need to be trained to learn the features that optimally represent the data. Such deep learning algorithms includes a multilayer, deep neural network that transforms input data (e.g. images) to outputs while learning higher level features. Successful neural network models for image analysis are semantic segmentation NNs. One example is the so-called convolutional neural network, CNN. CNNs contain many layers that transform their input using kernels, also known as convolution filters, consisting of a relatively small sized matrix. Other successful neural network models for image analysis are instance segmentation NNs. As known to the skilled person, instance segmentation NNs differ from semantic segmentation NNs in terms of algorithm and output, even in cases where the input, e.g. the images, are identical or very similar.

In general, semantic segmentation may relate, without being limited thereto, to detecting, for every pixel (in 2D) or voxel (in 3D), to which class of the object the pixel belong. Instance segmentation, on the other hand, may relate, without being limited thereto, to detecting, for every pixel, a belonging instance of the object. It may detect each distinct object of interest in an image. In embodiments, 2D instance segmentation, preferably operating on 2D images, relates to Mask R-CNN, DeepMask, and/or TensorMask. In embodiments, 3D instance segmentation, preferably operating on a 3D point cloud generated from 2D images, relates to 3D-BoNet and/or ASIS.

In embodiments, the object belongs to a plurality of two or more objects comprised in said scene, and preferably the handle is shared by the plurality of objects being clustered objects. In embodiments, the object belongs to a plant and is comprised in a plurality of objects being a bunch. In embodiments, the handling of a plurality of objects relates to handling the objects at a shared handle for said objects, e.g., harvesting bunches of tomatoes. In embodiments, the handling of the plurality of objects relates to handling the objects by their respective handle, e.g. harvesting tomato by tomato or harvesting isolated fruits present in the same scene. In embodiments wherein the segmentation NN comprises an instance segmentation NN, the detection of instances may relate to identifying each instance of the plurality of objects being clustered objects, e.g. identifying the number of tomatoes in a bunch.

The term neural network, NN, refers to any neural network model. The NN may comprise any or any combination of a multilayer perceptron, MLP, a convolutional neural network, CNN, and a recurrent neural network, RNN. A trained NN relates to training data associated with a neural network based model.

In embodiments, said obtained image comprises color information, and said obtained image is a depth image comprising RGBD data. This has the advantage of being provided by many vision sensors, or, equivalently, visual sensors, available off the shelf while exhibiting low latency.

In embodiments, at least said determining of handling data comprises re-rendering a 3D image from said depth image.

In embodiments, said segmenting comprises 2D semantic segmentation performed on said depth image, wherein said trained semantic segmentation NN comprises a 2D NN, preferably a 2D u-net or a 2D rotation equivariant NN, being trained on a color representation comprising depth information as an artificial additional color.

In embodiments, said segmenting comprises re-rendering a 3D voxel representation from said depth image and performing 3D semantic segmentation on said 3D voxel representation, wherein said trained semantic segmentation NN comprises a 3D NN, preferably a PointNet++ or a 3D rotation equivariant NN or, more preferably, a RandLA-Net.

In embodiments, the method comprises the further step of actuating said robot head toward said robot head position.

In embodiments, the method comprises, during or after actuating said robot head toward said new position, repeating at least one of step (a) to (d), preferably each of step (a) to (d), one or more times, preferably until a predetermined handling condition is met.

In embodiments, the pose further comprises a 3D approaching angle, wherein said computing comprises computing said approaching angle based on one or more of said plurality of semantic components for avoiding collision of said robot head with said one or more semantic components.

In embodiments, said handle extends between a distal end and a proximal end along a handle direction, wherein said determining of handling data comprises determining said handle direction belonging to said handling data, wherein the pose further comprises a 3D approaching angle, wherein said computing comprises computing said approaching angle based at least on said handle direction.

In embodiments, said robot head comprises clamping means for clamping said handle, wherein preferably said computed handling position and said approaching angle are directed at clamping and displacing said handle for separating said handle and said object from further portions of an entity, preferably a plant, to which the object and the handle belong; and/or wherein preferably the method comprises the further step of actuating said robot head toward said robot head position and actuating said clamping means for clamping and displacing said handle, and/or wherein preferably said robot head further comprises receiving means for receiving said object after said separating.

In embodiments, said robot head comprises clamping means for clamping said handle at said handling position preferably being a medial position. This may relate to grip optimization, wherein preferably the handling position is optimized for good grip. This may for instance relate to embodiments wherein a straight portion of the handle, e.g. a straight portion of a branch, is detected, and/or wherein a portion of the handle without protrusions is detected. In embodiments, the robot head comprises cutting means for cutting said handle at a cutting position preferably being a distal position. This may relate to further grip optimization, wherein preferably the cutting position is optimized, more preferably both the handling position and the cutting position are optimized, for good handling and cutting. This may again for instance relate to embodiments wherein a straight portion of the handle, e.g. a straight portion of a branch, is detected, and/or wherein a portion of the handle without protrusions is detected. In embodiments, the method preferably comprises the further step of computing, based on said second semantic component, said cutting position, and/or wherein preferably said computed handling position and said approaching angle are directed at clamping said handle at said handling position and cutting said handle at said cutting position for separating said handle and said object from further portions of an entity, preferably a plant, to which the object and the handle belong; and/or wherein preferably the method comprises the further step of actuating said robot head toward said robot head position and actuating said clamping means for clamping said handle and actuating said cutting means for cutting said handle, and/or wherein preferably said robot head further comprises receiving means for receiving said object after said separating. In embodiments, which may optionally be combined with embodiments with a plurality of vision sensors comprising a stationary sensor, the method comprises the further step, after clamping, of verifying whether clamping was successful, preferably based on reiterating steps (a) to (d). This may have the advantage of detecting whether no parts of the scene, e.g. leaves, caused collision during approaching or clamping of the handle of the object, preferably before cutting, so as to ensure whether additional movement or repetition or other action is required before cutting. In embodiments, such detecting may advantageously be performed by a stationary vision sensor as such a vision sensor may provide for a better overview than a moving vision sensor. In embodiments, which may optionally be combined with embodiments with a plurality of vision sensors comprising a stationary sensor, the method comprises the further step, after cutting, of verifying whether cutting was successful, preferably based on reiterating steps (a) to (d).

In embodiments, said segmenting according to said plurality of semantic components relates to a third semantic component, wherein said object and said handle belong to a plant further comprising a main stem relating to said third semantic component, and wherein said computing of said pose relates to separating said object, preferably said object and said handle, from said third semantic component.

In embodiments, said robot head comprises cutting means, and wherein determining of said pose comprises

- finding pixels on a first boundary between the second segment component and the third segment component;
- clustering said pixels for determining a first position;
- finding a second position on a second boundary between the handle and any of: the object, or a fork connecting the object and the handle and being closest to said handle;
- determining a cutting position at between ¼$^{th}$ and ¾$^{th}$ between said first position and said second position, preferably at between ⅖$^{th}$ and ⅗$^{th}$ between said first position and said second position.

In embodiments, said handling position is determined as a point belonging to said handle being farthest removed from said object. This has the advantage of simplicity and ensures that the integrity of said object is maintained as much as possible.

In embodiments, said object relates to a plurality of clustered object instances, and wherein said handling position is determined as said point belonging to said handle being farthest removed from a center of said clustered object instances. This is advantageous as it enables handling complex objects comprising a plurality of clustered object instances, such as a bunch of tomatoes or a bunch of grapes.

In embodiments, the NN is rotation equivariant. In embodiments, the NN is translation and rotation equivariant.

The advantage of rotation equivariance may be understood from the following. A common challenge for machine learning on images is that a fully generic neural networks (i.e. "fully connected" or based on "multi-layer perceptrons") will only learn to recognize objects in the positions and rotations that they appear in the input images. There are two main approaches for handling this.

- A first, more "pragmatic" approach is to make sure that the objections of interest appear in all positions and orientations in the training dataset. This can be done either by increasing the amount of data collected, or by synthetically translating and rotating the captured inputs (and their corresponding labeled outputs). The latter approach is called "data augmentation". In embodiments, data augmentation is used.
- The second approach is the use of neural networks that are based on convolution. Convolution has the geometric property that if the input image is shifted spatially, the output is shifted by the same amount. This is called translation (or shift) equivariance. While the convolutional neural network architectures used in practice have accumulated some operators that compromise this equivariance (like max pooling), translation has contributed the boom in AI driven computer vision over the last decade. In embodiments, NN are used that are equivariant to both rotation and translation.

Rotation equivariance in deep learning have posed challenges when compared to translational equivariance, primarily because the group theory based mathematics necessary for doing a fully general and correct implementation are more complex.

Rotation equivariant NNs are known for specific applications, see, e.g., the "e2cnn" software library that makes experimentation with equivariant architectures feasible without a need to know group theory, see (Maurice Weiler, Gabriele Cesa, General E(2)-Equivariant Steerable CNNs, Conference on Neural Information Processing Systems (NeurIPS), 2019). This library defines rotation equivariant versions of the many of the same layers found in Tensorflow and in pytorch.

Applicant has found such rotation equivariant NNs to be particularly useful for visual servoing, as distinguished from other problems for which a rotation equivariance NN may be less useful. In many applications, the objects of interest do indeed always appear in the same orientation in the image. For example, in street scenes, pedestrians and cars are usually not "upside down" in the image. However, in visual servoing applications, the vision sensor is mounted on the robot head, and will not always be upright; it will rotate as necessary to align with the object, and the object appears in a variety of orientations.

In the context of the invention, visual servoing may relate to any automation wherein the vision system is in the control loop. This may relate to any moving or stationary vision sensor. A moving sensor may have the advantage of getting a better view while approaching an object. On the other hand, a stationary sensor may have many advantages related to detection of touch by accident, occlusions, oversight of the detection of both the action and the effect of an action. In this regard, a stationary sensor may advantageously provide a supervisor concept either by itself (as single sensor) or as complementing a moving visual sensor. Furthermore, having only a stationary vision sensor may provider faster execution of detection and actuation, and may reduce the number of iterations in the control loop.

In embodiments with a 2D rotation equivariance NN, U-Net-like architectures are preferred, preferably based on rotation equivariant operators from (Maurice Weiler, Gabriele Cesa, General E(2)-Equivariant Steerable CNNs, Conference on Neural Information Processing Systems (NeurIPS), 2019). In embodiments with a 2D NN, Furthermore, some of the translational equivariance that is lost in typical naive max pooling downsampling implementations is recovered based on the method disclosed in (Richard Zhang. Making Convolutional Networks Shift-Invariant Again, International Conference on Machine Learning, 2019).

In embodiments, the NN involves only equivariant layers. In embodiments, the NN involves only data augmentation. In embodiments, the NN involves both equivariant layers and data augmentation.

In embodiments with a 3D rotation equivariance NN, the NN preferably comprises one or more neural network architectures based on the "e3cnn" library, see (Mario Geiger et al, (2020, Mar. 22). github.com/e3nn/e3nn (Version v0.3-alpha). Zenodo. doi:10.5281/zenodo.3723557). Applicant has found this to be particularly advantageous. Indeed, for data in a 3D point cloud representation, the motivation for equivariance is even stronger than in 2D. While a 2D network can at best be equivariant to rotations about the viewing axis, a 3D network can be equivariant to any 3D rotation. The "e3cnn" library, like the "e2nn" library, contains definitions for convolutional layers that are both rotation and translation equivariant.

It is noted that the space of 3D rotation equivariance NNs is even less explored than that of 2D rotation equivariance NN.

In embodiments, the NN involves only equivariant layers. In embodiments, the NN involves only data augmentation. In embodiments, the NN involves both equivariant layers and data augmentation.

In embodiments, said semantic segmentation NN is a CNN. In embodiments, the NN comprises any or any combination of: 2D u-net, 3D u-net, Dynamic Graph CNN (DGCNN), PointNet++, RandLA-Net. In preferred embodiments, semantic segmentation in two dimensions is done with a convolutional neural network, CNN. In alternative embodiments, instead of a 2D CNN, also a 2D NN that is not convolutional may be considered. In preferred embodiments, segmentation in three dimensions is done with a neural network that may either be convolutional, such as a DGCNN, or non-convolutional, such as PointNet++. In embodiments, another variant of PointNet++ relating to PointNet may be considered without altering the scope of the invention. In preferred embodiments, the NN relates to RandLA-Net. In preferred embodiments, semantic segmentation with a 2D CNN relates to u-net. In preferred embodiments, semantic segmentation with a 3D NN relates to DGCNN or PointNet++ or, preferably, RandLA-Net. Herein, DGCNN may relate to methods and systems described in (Yue Wang et al., Dynamic Graph CNN for Learning on Point Clouds, CoRR, 2018, http://arxiv.org/abs/1801.07829), PointNet++ may relate to methods and systems described in (Charles R. Qi et al., PointNet++: Deep Hierarchical Feature Learning on Point Sets in a Metric Space, 2017, https://arxiv.org/abs/1706.02413), and RandLA-Net may relate to methods and systems described in (Qingyong Hu, RandLA-Net: Efficient Semantic Segmentation of Large-Scale Point Clouds, doi: 10.48550/arXiv.1911.11236).

In embodiments, said actuation relates to actuating said robot head and preferably furthermore comprises actuating said actuation means and/or said cutting means.

In embodiments, said vision sensor may or may not be mounted on said robot head, wherein said system comprises a second vision sensor for performing a pre-scan of an environment for determining whether said handling is required, wherein said second vision sensor is mounted on a portion of said system different from said robot head. In embodiments, both the vision sensor and the second vision sensor are mounted on portions of the system different from said robot head. Hereby, the mounting on a portion of the system not moving along with the robot head may be advantageous since it enables, e.g., tracking of the movement of the system as a whole, without being influenced by the movement of the robot head. This may be particularly advantageous for pre-scanning, as it allows preparing the handling of a next object while the handling of the current object is still ongoing, without experiencing impact from the robot head movement that may be involved in the handling.

In embodiments, said second vision sensor comprises a plurality of sensor units, preferably a plurality of cameras, wherein preferably the plurality is provided on different heights. This may have the advantage of having a better view of the environment and the object, as is, e.g., the case for picking of tomatoes or deleafing of tomato plants, which relates to plants of considerable height.

The invention involves obtaining an image preferably comprising color information and 3D information.

In embodiments, the robot head comprises clamping means which may be used for applications of gripping objects, removing objects from belt conveyors or baskets, transportation of objects and assortment of objects. However, other tasks could be handled, as well. Examples of objects that are gripped by the robotic element include industrial products, packaged goods, food, entire plants, and material such as metal or woods. However, organisms such as crops or fishery can be handled, as well. Thus, the objects that are handled are not limited to objects of a specific category.

In embodiments, the robot head may comprise cutting means. Robot heads of different shapes or different types can be used in embodiments according to the invention.

According to further aspects of the invention, which cannot be construed as limiting the scope in any way, the invention relates to following clauses 1-16.

Clause 1. Method for computing a pose for a robot head for handling an object (1) by means of a handle (2) connected to said object (1), comprising the steps of:

(a) obtaining (3001), by means of a vision sensor, said vision sensor preferably mounted on said robot head, an image of a scene comprising said object (1) and said handle (2), said image comprising 3D information and preferably color information;

(b) segmenting (3001), by means of a trained segmentation NN, preferably a semantic segmentation NN, said image, according to a plurality of semantic components comprising at least a first semantic component relating to said object (1) and a second semantic component relating to said handle (2);

(c) determining (3002), based on said plurality of semantic components, handling data for handling said object, said handling data comprising a handling position (21*a*) being on said handle (2); and (d) computing (3003), based on said handling data, a pose for said robot head, said pose comprising at least a robot head position for approaching said handle (2), wherein preferably the object belongs to a plurality of two or more objects comprised in said scene, and wherein more preferably the handle is shared by the plurality of objects being clustered objects.

Clause 2. Method of clause 1, wherein said vision sensor is mounted on said robot head.

Clause 3. Method of clause 1 or 2, wherein said obtained image comprises color information, and wherein said obtained image is a depth image comprising RGBD data.

Clause 4. Method of clause 3, wherein at least said determining (3002) of handling data comprises re-rendering a 3D image from said depth image.

Clause 5. Method of clauses 1-4, wherein said segmenting (3001) comprises 2D semantic segmentation performed on said depth image, wherein said trained semantic segmentation NN comprises a 2D NN, preferably a 2D u-net or a 2D rotation equivariant NN, being trained on a color representation comprising depth information as an artificial additional color.

Clause 6. Method of clauses 1-5, wherein said segmenting (3001) comprises re-rendering a 3D voxel representation from said depth image and performing 3D semantic segmentation on said 3D voxel representation, wherein said trained semantic segmentation NN comprises a 3D NN, preferably a PointNet++ or a 3D rotation equivariant NN.

Clause 7. Method of clauses 1-6, wherein the method comprises the further step of actuating said robot head toward said robot head position, and wherein preferably the method comprises, during or after actuating said robot head toward said new position, repeating step (a) to (d) one or more times, until a predetermined handling condition is met.

Clause 8. Method of clauses 1-7, wherein the pose further comprises a 3D approaching angle, wherein said computing (3003) comprises computing said approaching angle based on one or more of said plurality of semantic components for avoiding collision of said robot head with said one or more semantic components.

Clause 9. Method of clauses 1-8, wherein said handle (2) extends between a distal end and a proximal end along a handle direction (4), wherein said determining (3002*a*) of handling data comprises determining said handle direction (4) belonging to said handling data, wherein the pose further comprises a 3D approaching angle, wherein said computing (3003) comprises computing said approaching angle based at least on said handle direction.

Clause 10. Method of clauses 1-9, wherein said robot head comprises clamping means for clamping said handle (2), wherein said computed handling position and said approaching angle are directed at clamping and displacing said handle for separating said handle and said object from further portions of an entity, preferably a plant, to which the object and the handle belong; wherein preferably the method comprises the further step of actuating said robot head toward said robot head position and actuating said clamping means for clamping and displacing said handle, and wherein preferably said robot head further comprises receiving means for receiving said object after said separating.

Clause 11. Method of clauses 1-9, wherein said robot head comprises clamping means for clamping (21) said handle (2) at said handling position preferably being a medial position (**21*a*), and cutting means for cutting said handle (2) at a cutting position preferably being a distal position (22*a***), wherein the method comprises the further step of computing, based on said second semantic component, said cutting position, wherein said computed handling position and said approaching angle are directed at clamping said handle at said handling position and cutting said handle at said cutting position for separating said handle and said object from further portions of an entity, preferably a plant, to which the object and the handle belong; wherein preferably the method comprises the further step of actuating said robot head toward said robot head position and actuating said clamping means for clamping said handle and actuating said cutting means for cutting said handle, and wherein preferably said robot head further comprises receiving means for receiving said object after said separating.

Clause 12. Method of clauses 1-10, wherein said segmenting (3001) according to said plurality of semantic components relates to a third semantic component, wherein said object (1) and said handle (2) belong to a plant further comprising a main stem (6) relating to said third semantic component, and wherein said computing (3003) of said pose relates to separating said object (1), preferably said object (1) and said handle (2), from said third semantic component.

Clause 13. Method of clause 12, wherein said robot head comprises cutting means, and wherein determining of said pose comprises

- finding pixels on a first boundary between the second segment component and the third segment component;
- clustering said pixels for determining a first position;
- finding a second position on a second boundary between the handle (2) and any of: the object (1), or a fork (3) connecting the object (1) and the handle (2) and being closest to said handle (2);
- determining a cutting position at between $1/4^{th}$ and $3/4^{th}$ between said first position and said second position, preferably at between $2/5^{th}$ and $3/5^{th}$ between said first position and said second position.

Clause 14. Method of clauses 1-13, wherein the NN is rotation equivariant.

Clause 15. Device for handling an object (1), comprising a processor and memory comprising instructions which preferably, when executed by said processor, cause the device to execute a method according to clauses 1-14.

Figure 5:
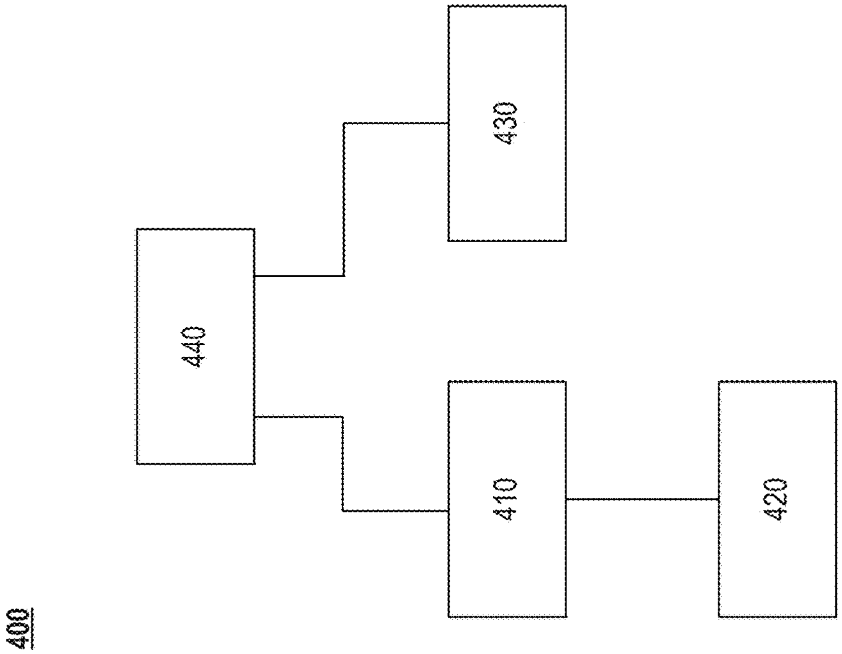
FIG. 5 shows an example system for handling an object.

Clause 16. System 400 (illustrated in FIG. 5) for handling an object (1), comprising:

- a robot head 410 (illustrated in FIG. 5);
- a vision sensor 430 (illustrated in FIG. 5), said vision sensor preferably mounted on said robot head;
- actuation means 420 (illustrated in FIG. 5) for actuating said robot head;
- a device 440 (illustrated in FIG. 5), preferably the device according to clause 15, said device being connected to said vision sensor and said robot head, said device comprising a processor and memory comprising instructions which preferably, when executed by said processor, cause the device to execute a method according to clauses 1-14; wherein said device is configured for:
- obtaining (3001), from said vision sensor, an image of a scene comprising said object (1) and a handle (2) connected to said object (1), said image comprising 3D information and preferably color information;
- segmenting (3001), by means of a trained segmentation NN, preferably a trained semantic segmentation NN, said image, according to a plurality of semantic components comprising at least a first semantic component relating to said object (1) and a second semantic component relating to said handle (2);
- determining (3002), based on said plurality of semantic components, handling data for handling said object, said handling data comprising a handling position (**21*a*) being on said handle (2**);
- computing (3003), based on said handling data, a pose for said robot head, said pose comprising at least a robot head position for approaching said handle (2); and—sending, to the actuation means, actuation instructions for actuating said robot head toward said robot head position; wherein said vision sensor is configured for:
- acquiring said image;
- sending the image to said device; wherein said actuation means is configured for:
- receiving actuation instructions from said device;
- actuating said robot head in accordance with said actuation instructions, wherein preferably the object belongs to a plurality of two or more objects comprised in said scene, and wherein more preferably the handle is shared by the plurality of objects being clustered objects.

Below, the invention is illustrated according to a plurality of example embodiments, which are not intended to limit the scope of the invention in any way.

Example 1: Example Method with Tomato Bunch

In example embodiments, the object is a tomato (1) indirectly connected to the handle (2). Particularly, in example embodiments the tomato (1) is an object belonging to a plurality of two or more clustered objects (1) being a bunch of tomatoes, and the handle is the branch connecting the bunch of tomatoes to the main stem, also referred to as peduncle (2). Thereby, in example embodiments, said peduncle (2) and said tomato (1) are connected by a fork, also referred to as a pedicel (3). The handle is to be clamped and cut in order to pick the bunch of tomatoes.

FIG. 1 shows an example bunch of tomatoes (1) to be detected, approached, and preferably picked. Via a pedicel (3), each tomato (1) is connected to the handle being the peduncle (2), which in turn is connected to the main stem, or for short, the stem (6).

This example further considers choosing the handling pose of the robot, in this case comprising both clamping and cutting, preferably based on a segmented depth image.

Preferably, the method is based on the pixel wise segmentation of the depth image into different classes (i.e. tomato fruit, main stem, stem cutting point candidates) as input, and comprises computing one 6DOF pose that the robot should move to in order to cut the fruit as output. Hereby, 6DOF relates to six degrees of freedom, i.e. three coordinates, e.g. xyz coordinates, and a 3D approaching angle, e.g. alpha, beta, gamma. In preferred embodiments, the involved NN is trained according to manual labeling, which may relate to labeled ground truth segmentations. In embodiments, the NN is a 2D network. In other embodiments, the NN is a 3D network.

This example furthermore relates to closed loop integration testing. Such testing may relate to one of, or both of, a "tabletop" scenario and the "greenhouse" scenario. Example embodiments relate to both of the two scenarios yet may be focused on one of the two to provide additional insight.

The tabletop scenario may relate to a simplified dataset in a lab setting, with tomatoes put on a tabletop for carrying out the invention, preferably including training of any NN involved. The greenhouse scenario may relate to an industrial greenhouse setting as known to the skilled person, wherein the invention is carried out, preferably including training of any NN involved. In embodiments, the method is carried out in any of both scenarios without requiring new training. This said, the greenhouse scenario may relate to more realistic lighting and/or contending with varying amounts of natural and artificial lighting of various colors and/or increased issues of reachability and visibility and/or foliage or other stems occluding the fruit and/or other plants in the background.

In example embodiments relating to the "tabletop" scenario, while preferably also being applicable to the greenhouse scenario, the method comprises the steps of:

- computing the center of the bunch of fruit being the bunch of objects;
- choosing the farthest point labeled as "stem" being the handle as the approach point being the handling position;
- determining the 3D direction of the stem where it was cut;
- computing the 6DOF pose that is aligned with the stem and closest to the current gripper pose.

In example embodiments, the method should first find the merge point of the tomato bunch stem to the main stem, and then estimate the 3D pose of the cutting point. Such methods may relate to the "greenhouse" scenario, while preferably also being applicable to the tabletop scenario, the method comprises the steps of:

- Find pixels that are on a boundary between parts of the data labeled "main stem", i.e. corresponding to the third semantic component, and the parts labeled as "side branches", i.e. handles corresponding to the second semantic components, and cluster them. This may advantageously identify locations where the main stem meets a side branch.
- For each side branch, extract the connected component for the branch. Find the first fork in that branch (going to the first fruit).
- Find a point midway between the above two points. This will be an approximate cutting point.
- The vector (3) between the points, i.e. the handle direction, preferably computed in the first two steps of a cycle, e.g., a cycle according to Example 3, runs along the stem. Hence, an additional vector to fully define the cutting pose is determined. In embodiments this is chosen to be the vector closest to the "down" direction, as ascertained using knowledge that the robot is mounted horizontally.
- Choose a third vector to complete the basis for the rotational part of the coordinate frame.

The NN may be any of a u-net, or PointNet++, a rotation equivariant NN such as the one disclosed in (Maurice Weiler, Gabriele Cesa, General E(2)-Equivariant Steerable CNNs, Conference on Neural Information Processing Systems (NeurIPS), 2019), or RandLA-Net.

Example 2: Example Relating to Clamping and Cutting

Figure 2:
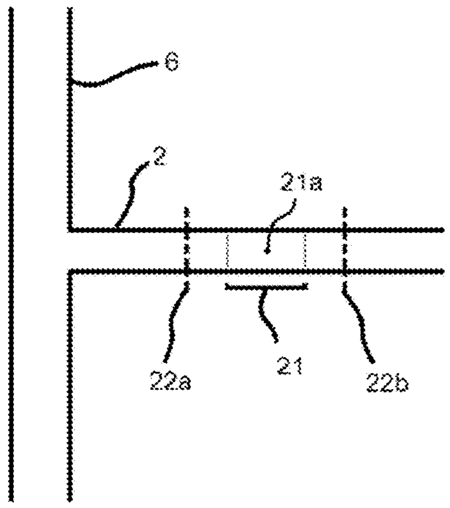
FIG. 2 shows an example relating to clamping and cutting of a handle.

FIG. 2 shows an example relating to clamping and cutting of a handle (2) connected on one end to an object (not shown) and connected on the other end to a further portion (6) of an entity to which the handle and the object belong. As the object is not shown, it is also noted that the figure is not drawn to scale. In examples, this may relate to the object being a tomato (1), the handle (2) being the peduncle (2), and the further portion being the main stem (6). In such applications, it is very important that the main stem is never cut, and the cutting of the handle generally has to be done with high precision, e.g., with handle length less than 100 mm or even less than 50 mm.

The object may correspond to a first semantic component, the further portion (6) to a third semantic component, and the handle (2) to a second semantic component. The handle is to be clamped and cut in order to separate the object from the further portion.

The robot head comprises clamping means for clamping (21) said handle (2) at said handling position, preferably being a medial position (21*a*), and cutting means for cutting said handle (2) at a cutting position preferably being a distal position (22*a*). The method comprises the further step of actuating said robot head toward said robot head position and actuating said clamping means for clamping said handle and actuating said cutting means for cutting said handle. The method comprises the further step of computing, based on said second semantic component, said cutting position, wherein said computed handling position and said approaching angle are directed at clamping said handle at said handling position and cutting said handle at said cutting position for separating said handle and said object from further portions of an entity, preferably a plant, to which the object and the handle belong. Preferably, after cutting at the cutting position, the handle is cut again at a second cutting position (22*b*) while still being clamped by the clamping means. This may yield a better finishing of the object, wherein the remains of the handle is smaller, leading to a more compact object, and/or wherein the end of the remaining part of the handle is cut more evenly, providing for better finishing of the object after cutting. The said robot head further comprises receiving means for receiving said object after said separating. Particularly, the receiving means may receive the object after the handle is cut at the second cutting position (22*b*).

In examples, the method may relate to

- finding pixels on a first boundary between the second segment component and the third segment component;
- clustering said pixels for determining a first position;
- finding a second position on a second boundary between the handle (2) and any of: the object (1), or a fork (3) connecting the object (1) and the handle (2) and being closest to said handle (2);

determining a cutting position (22*a*) at between ¼$^{th}$ and ¾$^{th}$ between said first position and said second position, preferably at between ⅖$^{th}$ and ⅗$^{th}$ between said first position and said second position, most preferably halfway between said first position and said second position.

Example 3: Example Relating to Cycles

Figure 3:
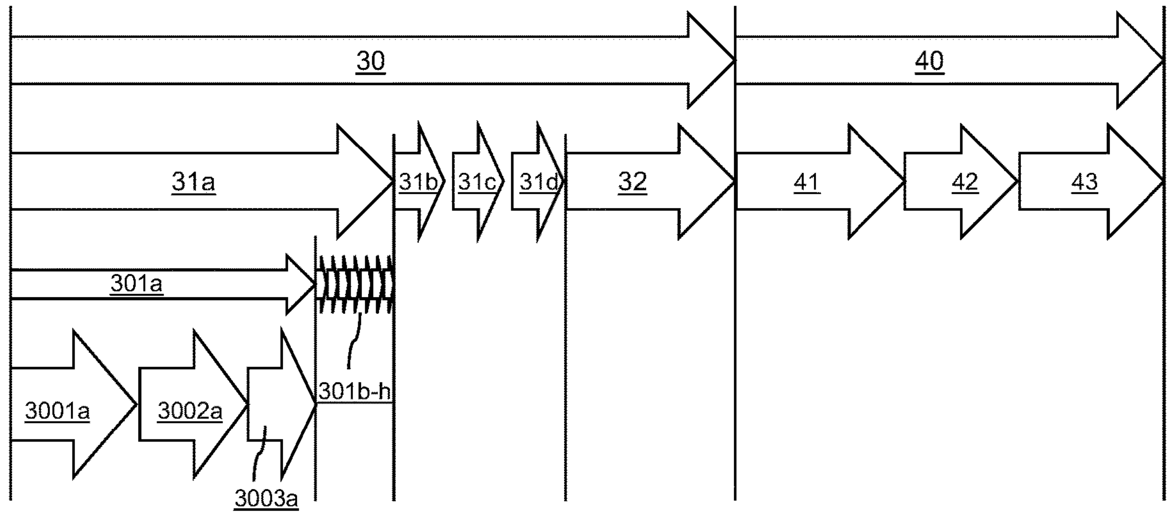
FIG. 3 illustrates an example of visual servoing cycles for picking and placing.

In this example, visual servoing is applied to the problem of picking and placing of a single tomato bunch. FIG. 3 illustrates an example of visual servoing cycles for picking and placing.

The visual servoing example relates to time budget with target times for each computation that must be performed. A proposed cycle time budget for the act of harvesting a single tomato bunch can be seen in FIG. 3. Each row of arrows is a subdivision of the time from the higher level task in the row above it.

The first row shows the picking phase (30) with a time budget of 1.2 s, and the placing phase (40), with a time budget of 1 s.

The second row shows a visual control cycle (31*a*) with a time budget of 250 ms, followed by three more visual control cycles (31*b-d*). This is continued with the closing of the clamping means (32), or, equivalently the gripper, with a time budget of 200 ms, ending the picking phase. This is followed by the move to the place point (41), with a time budget of 400 ms, the clamping means release (42), with a time budget of 200 ms, and the move to home (43), with a time budget of 300 ms.

The third row shows a single step (301*a*) of the visual servoing routine, with a time budget of 31 ms. The step is repeated seven more times (301*b-h*).

The fourth row shows the phases of the (first) single step (301*a*), i.e. the view prediction (3001*a*), relating to obtaining the image and segmenting it, the stem detection (3002*a*), relating to determining handling data, and the cut pose computing (3003*a*).

In example embodiments, operation is provided with a 4 Hz visual servoing control update frequency. This gives a cycle time of 250 ms for all analyses performed in the control loop. For example, in one control time slice 8 hypotheses may be required by the view selection/path planning algorithm. This consumes half of the cycle time, the cutting point analysis code must run at 2*8*4 Hz, with time to spare for the view selection code. This gives an analysis time for each simulated view of approx. 15 ms. To enable this time frame, in preferred embodiments, scene analysis is performed within a 10 ms time budget.

Example 4: Examples Relating to Picking

In example embodiments of this example, separating the object from further portions of an entity to which the object belongs relates to picking.

In example embodiments, the object is a tomato. This may relate to Example 1.

In example embodiments the object is a grape belonging to a plurality of two or more clustered objects being a bunch of grapes. The handle is shared by the plurality of objects and is to be clamped and cut in order to pick the bunch of grapes.

In example embodiments, the object is a leaf of a plant, preferably an old leaf that is to be removed in order to improve yield of the plant, e.g., a tomato plant, and/or any leaf of any plant that requires partial or full deleafing. In such embodiments, the leaf, e.g., corresponding to a first semantic component, is connected to the main stem, e.g., corresponding to a third semantic component, through a handle being a petiole, e.g., corresponding to a second semantic component. In example embodiments, the handle is to be clamped and displaced in order to pick the leaf. In other example embodiments, relating to the same or to other plants, the handle is to be clamped and cut in order to pick the leaf.

In example embodiments the object is a cucumber extending between a free end and a plant-related end, and the handle is the plant portion connecting the cucumber at the plant-related end to further portions of the plant. The handle is to be cut in order to pick the cucumber.

In example embodiments the object is an apple or a pear, and the handle is the stalk and/or pedicel. In example embodiments, the handle is to be clamped and displaced in order to pick the apple or pear, wherein the displacing may or may not relate to a twisting motion. In alternative embodiments, the handle may also be clamped and cut in order to pick the apple or pear.

Example 5: Examples Relating to Displacing

In example embodiments of this example, separating the object from further portions of an entity to which the object belongs relates to displacing.

In example embodiments, the object is a device part belonging to an entity being an electronic device, e.g., a modem or a computer, that requires dismantling. In such embodiments, one or more object types may be predetermined as being recognizable, preferably distinguishable, device parts for which the neural network is trained. Thereby, for each object type, a segmentation according to object and handle is performed, e.g., wherein one or more portions of the object are identified as advantageous, e.g., safe, positions for handling the object, corresponding to a second semantic component, and wherein, e.g., the remaining portions of the object correspond to the first semantic component. Thereby, separating the object from the electronic device relates to clamping the object at its handle and displacing it so as to remove it from further portions of the electronic device. In such example embodiments, the robot may be further configured to sort said device parts.

In example embodiments, the object is a loose object gathered together with other loose objects in an organized or disorganized fashion in a common container. Herein, the whole of container and loose objects is the entity to which the object belongs. Thereby, no cutting is involved, and the displacing of the handle merely relates to separating the object from the common container, without any physical connection between the handle and the further portions of the entity to which the object belongs. In such embodiments, one or more object types may be predetermined as being recognizable, preferably distinguishable, device parts for which the neural network is trained. Thereby, for each object type, a segmentation according to object and handle is performed, e.g., wherein one or more portions of the object are identified as advantageous, e.g., safe, positions for handling the object, corresponding to a second semantic component, and wherein, e.g., the remaining portions of the object correspond to the first semantic component. Thereby, separating the object from the container relates to clamping the object at its handle and displacing it so as to remove it from the container. In some example embodiments, the robot may be further configured to label the object with a sticker according to its object type and/or according to other information determined through an additional information determining step. In further examples, the robot may be further configured to then sort the objects with sticker and/or to then put the objects with sticker in a second common container. In other example embodiments, the robot may be further configured to, based upon a 3D feature of the object and/or the object type of the object, select one or more additional objects so as to obtain a predetermined selection of objects that is separated from the container.

Example 6: Cart with Pre-Scan

Figure 4:
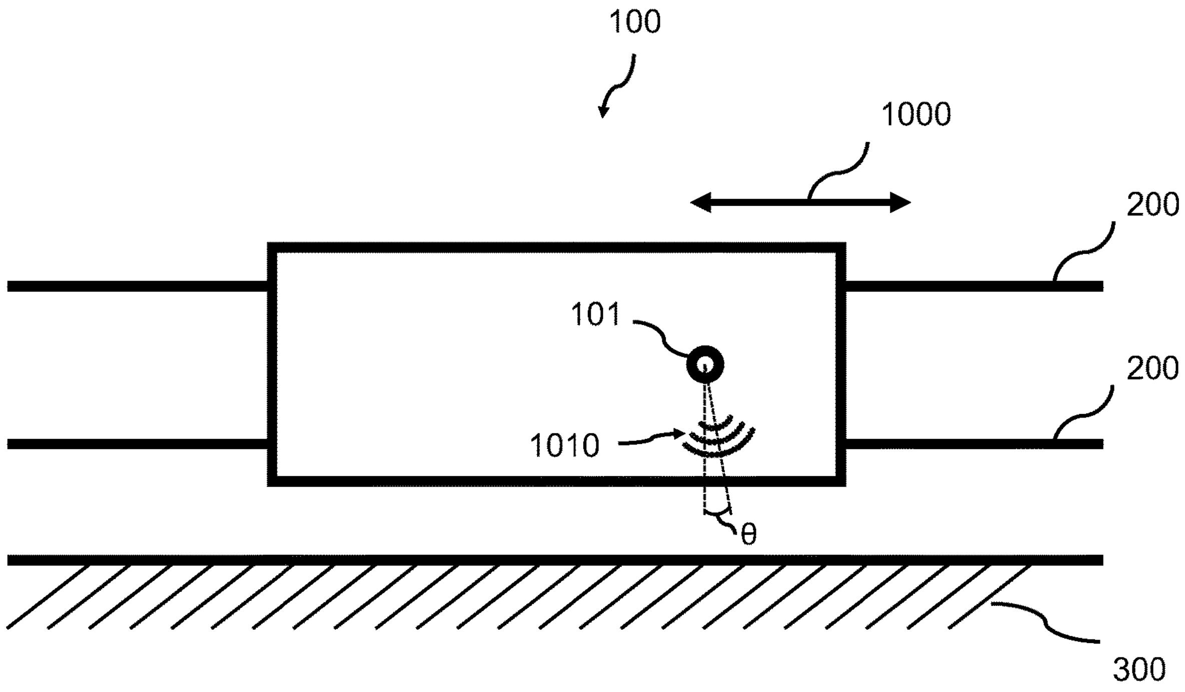
FIG. 4 shows a top view of an example cart relating to the invention.

In this example, the system 100 is a cart moving over a pair of parallel rails 200. FIG. 4 shows a top view of this example cart 100 relating to the invention.

Movement relates to back-and-forward movement 1000 along a single dimension being the direction along which the rails extend. The rails 200 are provided essentially in parallel to and next to the environment 300. The cart is used for tomato picking and/or deleafing of tomato plants, and hence, the environment 300 relates to a row of tomato plants. The objects to be handled are hence tomatoes or plant leaves. The system comprises system actuation means being wheels (not shown) enabling the movement 1000 along the rails. The actuation means are mounted on a bottom portion of the cart, e.g., a floor plate. The system comprises a robot arm (not shown) extending from the bottom portion of the cart and comprising, at its end, the robot head (not shown). Furthermore, the system comprises a first vision sensor mounted thereupon (not shown). In this example, the first vision sensor is mounted on a first vertical pole extending from a medial position, e.g., the middle of the bottom plate. However, the first vertical pole may also extend from another position with respect to the bottom portion of the cart, e.g., closer to the back or to the front or nearer to a lateral side. Furthermore, the first vision sensor need not be mounted on a pole but may be mounted on any portion of the cart, including the robot head. This first vision sensor is an RGBD sensor provided at least for visual servoing when the cart is at a system position according to steps (a) to (d). This may relate, e.g., to situations where the cart is standing still at a system position being a stopping position.

Additionally, the system 100 comprises a second vision sensor 101 being two vision sensor cameras vertically aligned at different height, allowing for a pre-scan of the environment. In this example, the two second vision sensor cameras are both RGBD cameras that may be of the same type as the first vision sensor. The two vision sensor cameras are mounted on a second vertical pole extending from a medial position near the front of the cart, e.g., at ¼th of the length of the cart, as shown in FIG. 4. However, the second vertical pole may also extend from another position with respect to the bottom portion of the cart, e.g., closer to the back or to the front or nearer to a lateral side, as long as a sufficiently wide viewing angle is available, i.e., no portions of the system stand in the way. Furthermore, the first vision sensor need not be mounted on a pole but may be mounted on any portion of the cart, yet preferably not on the robot head or the robot arm.

The position and vision angle of the two second vision sensor cameras is chosen different from that of the first vision sensor, allowing to optimally predict the feasibility and/or requirement of handling. Thereby, a trained pre-scan NN performs semantic segmentation on the environment image, yielding a segmented 3D representation. From this 3D representation, it is then determined whether an object can be detected and, if yes, whether an approaching route can be found to handle the object. Thereby, the viewing angle and viewing direction of the first sensor is considered, to ensure visibility during the visual servoing. Furthermore, also the actual path required to let the robot head pass is accounted for. These factors determine whether object handling is possible for the environment subject to the pre-scan, or not. If the object can be handled, the cart may be actuated to move toward a new system position suitable to handle the object, and subsequently handle the object. If the object cannot be handled, the cart may be actuated to skip the environment that was pre-scanned, and move toward another system position, in order to consider a new environment.

The first vision sensor and the two second vision sensors operate according to respective first and second vision cycles, wherein the first and second vision cycle are overlapping. Concretely, the pre-scan prepares the handling of a next object while the handling of the current object is still ongoing.

Both the picking and the deleafing may be carried out according to a similar cycle. The beginning of a cycle is marked by a pre-scan, during which the environment 101 is sampled 1010, e.g., photographed or filmed. Subsequently, it is determined, by means of a trained pre-scan NN, whether a bunch (in case of tomato picking) or leaf (in case of deleafing) can be detected within the environment, and if yes, what the approximate position of the object is within the detected scene. Additionally, an approximate approaching path may be determined based on the segmentation performed by the pre-scan NN. If an object is detected, the cart may or may not move toward a new system position (if required), and the robot arm is activated and visual servoing commences, based on the approximate position and, if available, also based on the approximate approaching path. If no object is detected, the robot arm is not activated, and instead the wheels are actuated for relatively displacing the cart with respect to the environment 300.

An advantage of the introduction of a pre-scan phase may be that better imaging may be obtained to scan an environment 300. Indeed, if all sensing must be done by the first visual sensor alone, valuable time may be lost owing to poor initial position or poor initial view for the first visual sensor. The second visual sensor allows effective first scanning which may be performed regardless of the visual servoing of the robot head.

Working with a pre-scan furthermore has important advantages in terms of speed gain. By pre-scanning, it may be determined rapidly that a certain bunch of tomatoes is still green and cannot be harvested yet. In such case, the cart may be actuated immediately to a next system position along the rails, skipping the bunch that need not be harvested, without the robot arm being used at all. Hence, steps (a) to (d) need not be carried out, and a speed gain is realized. In another example, the pre-scan may reveal that a bunch or leaf is intertwined with the main stem, or the bunch cannot be reached by the robot without collision with other bunches or greenhouse infrastructure, and for that reason cannot be automatically picked. In such cases the task of picking the bunch or leaf may be recorded electronically, thereby preferably maintaining a counter of number of objects that cannot be picked, and/or storing a location of the bunch or leaf yet to be picked. Storage of the location may be enabled by keeping track, by the system, of a position along the rails. Storage of the location may further be enabled by a GNSS (e.g., GPS, GLONASS, Galileo, etc) module comprised in the system, allowing to determine and record geographic coordinates of the leaf to be picked. Similarly, locations may be stored for bunches of tomatoes that cannot be picked. Recorded locations may then be used, e.g., as an instruction for manual intervention, to be carried out by an operator. In embodiments, the system may moreover determine whether a manual intervention is required or merely optional, i.e., the system may attribute priority levels to the recorded locations and associated tasks.

In this example, the second vision sensor cameras are mounted according to a second vision angle θ different from a first vision angle of said first vision sensor. In this example, the two second vision sensor cameras are mounted tilted toward the motion direction by 12° more than the first vision sensor. Overall, the second vision angle may be chosen in accordance with the viewing angle allowed by the sensor, wherein, e.g., a larger viewing angle capability of the sensor may allow a smaller vision angle θ. In this example, particularly, the two second vision sensor cameras are mounted tilted toward the motion direction by 12°, see θ in FIG. 4, and the first vision sensor is mounted perpendicularly with respect to said motion direction (not shown). During the actual handling of a current object, the first vision sensor is hence pointed toward a current object, whereas the second vision sensors, performing the pre-scan, are pointing in the direction of next objects. Moreover, in the example, the first vision sensor is mounted higher than each of the second vision sensors. Thereby, in this example, the first vision sensor is looking downwardly, thereby spanning an angle with the horizontal plane of between 15° and 45°, particularly about 30°. The second vision sensors, on the other hand, may span a smaller angle with the horizontal plane of, e.g., between (−10° to +10°). In this example, the second vision sensors look neither up or down, i.e. according to an angle of 0 degrees, and look in essentially or approximately parallel directions. In other examples, the second vision sensors may span different angles with the horizontal plane, e.g., may point according to converging or diverging directions.

With pre-scan being directed at increasing speed, tasks relating to object handling may be divided between the pre-scan, with the pre-scan NN, and the segmenting in step (b), with the segmentation NN. An advantageous approach is to optimize the division so that overall speed in real-life settings is optimized. This may be advantageous as it further allows to tailor the automation of object handling to the task at hand, by means of pre-scanning. Thereby, it may be noted that the timing constraints imposed on the pre-scanning may potentially be less stringent than for the actual object handling by the first sensor, as the object handling itself requires a certain minimal dwell time at a system position, affording some headroom to carry out the pre-scanning in parallel.

Example 7: Refrigerated Containers

In example embodiments, the object need not be separated but merely displaced. However, due to the complexity of the displacement task, it is advantageous to combine the visual servoing provided with the first vision sensor with a pre-scan realized with a second vision sensor. In this example, this relates to the displacing of objects being refrigerated containers, also known as reefers, belonging to a plurality of refrigerated containers. Thereby, each of the refrigerated containers may comprise a content to be cooled or may be empty and is present on a ship and is powered with an electrical cord. Thereby, the displacing of refrigerated containers relates to unloading the refrigerated containers from the ship. This unloading requires prior disconnection of the power cord, i.e., unplugging. Thereby, the power cord connection may be situated at the bottom left or bottom right or elsewhere on the refrigerated container. For unloading, it is hence important to detect the position of the power cord and/or the plug, in view of plugging and unplugging. The solution provided by the invention lies in the performing of a pre-scan by means of a second vision sensor, allowing to detect the position of the plug and/or the power chord. The actual handling of the container, involving the detection of a handle, i.e., a portion of the housing of the refrigerated container, may be performed by means of a first vision sensor with detailed 3D rendering for the power cord and/or plug. Thereby, the combination of first and second vision sensor is particularly advantageous, as it allows optimizing the pre-scan stage separately. Particularly, the pre-scan stage is carried out more rapidly by maintaining a fixed distance between the second vision sensor and the refrigerated containers, e.g., 0.5 m or 1 m or 2 m.

The invention claimed is:

1. A method for computing a pose for a robot head for handling an object by a handle connected to said object, comprising:

(a) obtaining, by a first vision sensor, an image of a scene comprising said object and said handle, said image comprising 3D information;

(b) segmenting, by a trained segmentation neural network (NN), said image, according to a plurality of semantic components comprising at least a first semantic component relating to said object and a second semantic component relating to said handle;

(c) determining, based on said plurality of semantic components, a handling data for handling said object, said handling data comprising a handling position being on said handle;

(d) computing, based on said handling data, a pose for said robot head, said pose comprising at least a robot head position for approaching said handle, and (e) actuating said robot head toward said robot head position, wherein the method comprises (α) preceding said (a), wherein said (α) comprises:

performing, by a second vision sensor different from said first vision sensor and not mounted on said robot head, a pre-scan of an environment for determining whether said handling is required, said second vision sensor travelling along with said first vision sensor, and wherein said performing of the pre-scan comprises:

obtaining, by the second vision sensor, an environment image and performing semantic segmentation on the environment image by a trained pre-scan NN, yielding a pre-scan segmented 3D representation, and from this pre-scan segmented 3D representation, determining whether an object can be detected and, if yes, whether an approaching route can be found to handle the object for determining whether to carry out said (a) to (d).

2. The method of claim 1, wherein the respective first and second vision sensor operate according to respective first and second vision cycles, wherein the first and second vision cycles are at least partially overlapping.

3. The method of claim 1, wherein said second vision sensor is mounted on a pre-scan portion of a system comprising said robot head, said pre-scan portion not belonging to said robot head, and wherein said determining whether to carry out said (a) to (d) relates to whether to actuate the system toward a new system position.

4. The method of claim 1, wherein said second vision sensor is mounted according to a second vision angle (θ) different from a first vision angle of said first vision sensor.

5. The method of claim 1, wherein said obtained image comprises color information, and wherein said obtained image is a depth image comprising RGBD data.

6. The method of claim 1, wherein said segmenting comprises two-dimensional (2D) semantic segmentation performed on a depth image, wherein a trained semantic segmentation NN comprises a 2D NN, being trained on a color representation comprising depth information as an artificial additional color.

7. The method of claim 1, wherein said segmenting comprises re-rendering a three-dimensional (3D) voxel representation from a depth image and performing 3D semantic segmentation on said 3D voxel representation, wherein a trained semantic segmentation NN comprises a 3D NN.

8. The method of claim 7, wherein said trained semantic segmentation NN comprises a PointNet++, a 3D rotation equivariant NN, or a RandLA-Net.

9. The method of claim 1, wherein the method comprises, during or after actuating said robot head toward a new system position, repeating said (a) to (d) one or more times until a predetermined handling condition is met based on one or more of the following:

- wherein the pose further comprises a 3D approaching angle, wherein said computing comprises computing said 3D approaching angle based on one or more of said plurality of semantic components for avoiding collision of said robot head with said plurality of semantic components; or
- wherein said handle extends between a distal end and a proximal end along a handle direction, wherein said determining of handling data comprises determining said handle direction belonging to said handling data, wherein the pose further comprises a 3D approaching angle, wherein said computing comprises computing said 3D approaching angle based at least on said handle direction; or
- wherein said robot head comprises a clamper configured to clamp said handle, wherein said computed handling position and said 3D approaching angle are directed at clamping and displacing said handle for separating said handle and said object from further portions of an entity to which the object and the handle belong; or
- wherein said robot head comprises the clamper configured to clamp said handle at said handling position and a cutter configured to cut said handle at a cutting position, wherein the method further comprises computing, based on said second semantic component, said cutting position, wherein said computed handling position and said approaching angle are directed at clamping said handle at said handling position and cutting said handle at said cutting position for separating said handle and said object from further portions of an entity to which the object and the handle belong, or
- wherein said segmenting according to said plurality of semantic components relates to a third semantic component, wherein said object and said handle belong to a plant further comprising a main stem relating to said third semantic component, and wherein said computing of said pose relates to separating said object from said third semantic component.

10. A device for handling an object comprising a processor and memory comprising instructions which, when executed by said processor, cause the device to execute the method according to claim 1.

11. The method of claim 1, wherein the object belongs to a plurality of two or more objects comprised in said scene, and wherein the handle is shared by the plurality of objects being clustered objects.

12. The method according to claim 11, wherein computing the pose for the robot head comprises:

- computing a center of a cluster of objects comprising the plurality of objects;
- selecting, as the handling position, a point on the handle that is farthest from the center of the cluster;
- determining a three-dimensional direction of the handle at the handling position; and
- computing a six-degree-of-freedom pose for the robot head that is aligned with the determined direction of the handle and closest to a current pose of the robot head.

13. The method of claim 1, wherein said second vision sensor is mounted tilted toward a motion direction by at least 5° and/or said first vision sensor is mounted perpendicularly with respect to said motion direction.

14. The method of claim 1, wherein determining whether the approaching route can be found to handle the object comprises considering a viewing angle and a viewing direction of the first sensor to ensure visibility during visual servoing, whereby also an actual path required to let the robot head pass, is accounted for.

15. The method of claim 1, whereby if the object cannot be handled, a cart is actuated to skip the environment that was pre-scanned, and move toward another system position, in order to consider a new environment.

16. The method according to claim 1, wherein the robot head comprises a clamper configured for clamping the handle at the handling position, and wherein the method further comprises, after actuating the robot head toward the robot head position and actuating the clamper, verifying whether clamping of the handle at the handling position was successful.

17. The method according to claim 1, wherein the robot head comprises a cutter configured for cutting the handle at a cutting position, and wherein the method further comprises, after actuating the robot head toward the robot head position and actuating the cutter, verifying whether cutting of the handle at the cutting position was successful.

18. The method according to claim 1, wherein the robot head comprises a cutter, and wherein determining the pose for the robot head comprises determining a cutting position by:

- finding pixels on a first boundary between the second semantic component relating to the handle and a third semantic component;
- clustering said pixels to determine a first position;
- finding a second position on a second boundary between the handle and at least one of the object or a fork connecting the object and the handle, said second position being closest to the handle; and
- determining the cutting position at a location between one-quarter and three-quarters of a distance between the first position and the second position.

19. A system for handling an object, comprising:

- a robot head;
- a first vision sensor;
- an actuator configured to actuate said robot head;
- a device being connected to said first vision sensor and said robot head, said device comprising a processor and memory comprising instructions which cause the device to execute the following:

obtaining, from said first vision sensor, an image of a scene comprising said object and a handle connected to said object, said image comprising 3D information;

segmenting, by a trained segmentation neural network (NN), said image, according to a plurality of semantic components comprising at least a first semantic component relating to said object and a second semantic component relating to said handle;

determining, based on said plurality of semantic components, handling data for handling said object, said handling data comprising a handling position being on said handle;

computing, based on said handling data, a pose for said robot head, said pose comprising at least a robot head position for approaching said handle; and sending, to the actuator, actuation instructions for actuating said robot head toward said robot head position;

wherein said first vision sensor is configured for:

acquiring said image;

sending the image to said device;

wherein said actuator is configured for:

receiving actuation instructions from said device;

actuating said robot head in accordance with said actuation instructions, wherein the object belongs to a plurality of two or more objects comprised in said scene, and wherein the handle is shared by the plurality of objects being clustered objects, and wherein said system comprises a second vision sensor for performing a pre-scan of an environment for determining whether said handling is required, wherein said second vision sensor is mounted on a pre-scan portion of said system different from said robot head, and wherein the instructions further cause the device to execute a pre-scan which comprises:

obtaining, by the second vision sensor, an environment image and performing semantic segmentation on the environment image by a trained pre-scan NN, yielding a pre-scan segmented 3D representation, and from this pre-scan segmented 3D representation, determining whether an object can be detected and, if yes, whether an approaching route can be found to handle the object for determining whether to carry out said (a) to (d).

20. The system of claim 19, wherein said system further comprises a system actuator configured to displace said system with respect to said environment, wherein said determining whether said handling is required relates to whether to actuate the system toward a new system position.

* * * * *